(12) United States Patent
Moriyama et al.

(10) Patent No.: US 7,840,117 B2
(45) Date of Patent: Nov. 23, 2010

(54) INFORMATION RECORDING MEDIUM, APPARATUS FOR RECORDING THE SAME AND APPARATUS FOR REPRODUCING THE SAME

(75) Inventors: Yoshiaki Moriyama, Tsurugashima (JP); Takao Sawabe, Tokyo-to (JP); Kaoru Yamamoto, Tsurugashima (JP); Ryuichiro Yoshimura, Tokorozawa (JP); Akihiro Tozaki, Tsurugashima (JP); Junichi Yoshio, Tokorozawa (JP)

(73) Assignee: Pioneer Electronic Corporation, Tokyo (JP)

( * ) Notice: Subject to any disclaimer, the term of this patent is extended or adjusted under 35 U.S.C. 154(b) by 1939 days.

(21) Appl. No.: 10/858,268

(22) Filed: Jun. 2, 2004

(65) Prior Publication Data

US 2004/0218908 A1 Nov. 4, 2004

Related U.S. Application Data

(60) Continuation of application No. 09/559,971, filed on Apr. 28, 2000, now Pat. No. 6,757,483, which is a division of application No. 08/820,257, filed on Mar. 18, 1997, now Pat. No. 6,104,684.

(30) Foreign Application Priority Data

Mar. 19, 1996 (JP) .................................. P08-63591

(51) Int. Cl.
H04N 7/00 (2006.01)
(52) U.S. Cl. ............................. 386/95; 386/46; 386/125
(58) Field of Classification Search .................. 386/46, 386/95, 125
See application file for complete search history.

(56) References Cited

U.S. PATENT DOCUMENTS

| | | | |
|---|---|---|---|
| 5,477,516 A | 12/1995 | Takezawa |
| 5,590,107 A | 12/1996 | Chatani |
| 5,596,565 A | 1/1997 | Yonemitsu et al. |
| 5,627,657 A | 5/1997 | Park |
| 5,646,931 A | 7/1997 | Terasaki |
| 5,648,954 A | 7/1997 | Satoh |
| 5,687,160 A | 11/1997 | Aotake et al. |
| 5,687,397 A | 11/1997 | Ohmori |
| 5,691,972 A | 11/1997 | Tsuga et al. |
| 5,721,720 A | 2/1998 | Kikuchi et al. |
| 5,732,067 A | 3/1998 | Aotake |
| 5,737,308 A | 4/1998 | Nakai et al. |
| 5,740,304 A | 4/1998 | Katsuyama et al. |

(Continued)

FOREIGN PATENT DOCUMENTS

CN 1095880 11/1994

(Continued)

*Primary Examiner*—Thai Tran
*Assistant Examiner*—Girumsew Wendmagegn
(74) *Attorney, Agent, or Firm*—Drinker Biddle & Reath LLP

(57) ABSTRACT

An information recording medium includes: a plurality of recorded information pieces being independent of each other; a plurality of individual attribute information pieces each corresponding to each of the recorded information piece and including information relating to attributes of the recorded information piece and functions in reproduction; and an aggregate attribute information piece, recorded at a position read out prior to any other positions on said recording medium, and including at least a part of the individual attribute information piece for all of the recorded information pieces.

44 Claims, 12 Drawing Sheets

U.S. PATENT DOCUMENTS

| | | | |
|---|---|---|---|
| 5,754,521 A | 5/1998 | Yokota | |
| 5,774,441 A | 6/1998 | Nakagawa | |
| 5,793,726 A | 8/1998 | Nagano | |
| 5,870,523 A * | 2/1999 | Kikuchi et al. | 386/95 |
| 5,896,358 A | 4/1999 | Enddoh et al. | |
| 5,930,450 A | 7/1999 | Fujita | |
| 6,061,496 A | 5/2000 | Nakamura et al. | |
| 6,075,920 A | 6/2000 | Kawamura et al. | |
| 6,094,414 A | 7/2000 | Taira et al. | |
| 6,104,684 A | 8/2000 | Moriyama et al. | |
| 6,118,927 A | 9/2000 | Kikuchi et al. | |
| 6,128,434 A | 10/2000 | Hirayama et al. | |
| 6,253,025 B1 | 6/2001 | Kitamura et al. | |
| 6,418,271 B1 | 7/2002 | Cookson et al. | |
| 2001/0031136 A1 | 10/2001 | Kawamura et al. | |

FOREIGN PATENT DOCUMENTS

| | | |
|---|---|---|
| EP | 325525 | 7/1989 |
| EP | 424903 | 5/1991 |
| EP | 459157 | 12/1991 |
| EP | 521487 | 1/1993 |
| EP | 542377 | 5/1993 |
| EP | 644692 | 3/1995 |
| EP | 677 843 A1 | 10/1995 |
| EP | 676894 | 10/1995 |
| EP | 685 845 A2 | 12/1995 |
| EP | 696 798 A1 | 2/1996 |
| EP | 724 264 A2 | 7/1996 |
| EP | 0 737 979 | 10/1996 |
| EP | 737 008 A2 | 10/1996 |
| EP | 737 009 A2 | 10/1996 |
| EP | 737 975 A2 | 10/1996 |
| WO | WO 94/07332 | 3/1994 |
| WO | WO 95/12179 | 4/1995 |
| WO | WO 95/12179 | 5/1995 |

\* cited by examiner

LOGICAL STRUCTRE OF RECORD INFORMATION
(LOGICAL FORMAT)

STRUCTURE OF INTERLEAVED UNIT

IU : INTERLEAVED UNIT

14a: VTS CATEGORY
14b: VIDEO ATTRIBUTE OF VTS
14c: NUMBER OF AUDIO STREAMS OF VTS
14d: AUDIO STREAM ATTRIBUTE OF VTS
14e: NUMBER OF SUB-PICTURE STREAM OF VTS
14f: SUB-PICTURE STREAM ATTRIBUTE OF VTS
14g: NUMBER OF MULTICHANNEL AUDIO STREAM OF VTS
14h: MULTICHANNEL AUDIO STREAM ATTRIBUTE OF VTS

| | COPY FLAG | REPRODUCTION APPARATUS LIMITATION | APPLICATION TYPE | |
|---|---|---|---|---|
| | 15a | 15b | 15c | |

COPY FLAG

00: PROHIBITED FROM COPYING ANYTHING
01: PROHIBITED FROM COPYING PARTLY
10: (RESERVED)
11: PERMIT TO DOPY

REPRODUCTION APPARATUS LIMITATION

00: NOT LIMITED
01: (RESERVED)
10: (RESERVED)
11: LIMITED

APPLICATION TYPE

0000: NOT SPECIFIED
0001: KARAOKE

<u>14b</u>

VIDEO COMPRESSION MODE
   00: MPEG-1
   01: MPEG-2

FRAME RATE
   00: 29.97/s
   01: 25/s

DISPLAY ASPECT RATIO
   00: 3:4
   01: 9:16

DISPLAY MODE
   00: PAN-SCAN AND LETTERBOX PERMITTED
   01: PAN-SCAN ONLY
   10: LETTERBOX ONLY
   11: (RESERVED)

| AUDIO CODING MODE | MULTICHANNEL INFORMATION | AUDIO TYPE | APPLICATION TYPE | QUANTIZATION BIT NUMBER | SAMPLING FREQUENCY | NUMBER OF AUDIO CHANNELS | APPLICATION INFORMATION |
|---|---|---|---|---|---|---|---|
| 15h | 15i | 15j | 15k | 15l | 15m | 15o | 15p |

AUDIO CODING MODE
- 000: DOLBY AC-3
- 010: MPEG-1 OR MPEG-2
- 011: MPEG-2
- 100: LINEAR PCM

MULTICHANNEL INFORMATION
- 0: MULTICHANNEL INFORMATION EXIST
- 1: MULTICHANNEL INFORMATION NOT EXIST

AUDIO TYPE
- 00: NOT SPECIFIED
- 01: LANGUAGE INCLUDED

APPLICATION TYPE
- 00: NOT SPECIFIED
- 01: KARAOKE
- 10: SURROUND

QUANTIZATION BIT NUMBER
- 00: 16BITS
- 01: 20BITS
- 10: 24BITS
- 11: (RESERVED)

SAMPLING FREQUENCY
- 00: 48KHZ
- 01: 96KHZ

NUMBER OF AUDIO CHANNELS
- 000: 1CH
- 001: 2CH
- 010: 3CH
- 011: 4CH
- 100: 5CH
- 101: 6CH
- 110: 7CH
- 111: 8CH

INFORMATION RECORDING MEDIUM, APPARATUS FOR RECORDING THE SAME AND APPARATUS FOR REPRODUCING THE SAME

This is a continuation application of prior application Ser. No. 09/559,971, filed on Apr. 28, 2000 now U.S. Pat. No. 6,757,483, which is a divisional application of prior application Ser. No. 08/820,257, filed on Mar. 18, 1997, now U.S. Pat. No. 6,104,684. These prior applications are incorporated by reference herein in their entireties.

BACKGROUND OF THE INVENTION

1. Field of the Invention

The present invention relates to an information recording medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information recording medium, and a reproducing apparatus for reproducing the information from the information recording medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

Namely, it is impossible for a user to choose the language used in the subtitle on the screen (e.g., from subtitle of Japanese and the original language) in the case of watching a foreign movie recorded on a LD or to choose the voices of a song (e.g., from English voices or Japanese Voices) in the case of listening to the music recorded on a CD.

Nowadays, apart from the above-mentioned conventional CD, it is proposed and developed a DVD which is an optical disc which disc size is identical to CD and which recording capacity is enhanced to be approximately ten times larger than that of CD. In the DVD, a plurality of information units, which together constitute successive or continuous video and/or audio information, are recorded separately on the disk, and the control information for those information units are also recorded in a manner corresponding to the respective information units. Therefore, the control information is referred to when the respective information units are reproduced. The control information includes information representing attributes of the information units as well as information representing reproducing orders of the information units.

However, since the attributes information is recorded only in pair with the information unit in a manner being preceding or following the corresponding information unit, the contents of the information unit is unknown until the information unit is actually searched and read. Therefore, if a user designates a special function and/or specification prior to the reproduction, he can not know the possibility of the designated special function or the like until the corresponding control information is searched and the contents are checked. In other words, even when the special function designated by the user can not be performed, the reproducing device needs to search for the corresponding control information and read the contents. Then, the reproducing device notifies the user that the designated special function can not be performed. However, viewed from the user, it is quite unfriendly and inconvenient because he has to wait for a while until the search ends and eventually is notified that the function is not possible.

On the other hand, if the author of the DVD has prepared the menu pictures representing various functions and/or specifications for the respective information units beforehand and has recorded them on the DVD, the user can rapidly achieve the desired function or the like by using the menu pictures. However, the preparation of the menu pictures completely depends on the discretion of the author side, and hence it is not always prepared for and recorded on every DVD. Therefore, when reproducing the DVD software on which the menu pictures are not recorded, the user cannot help encountering the above described inconveniences.

SUMMARY OF THE INVENTION

It is therefore an object of the present invention to provide an information recording medium, an apparatus for recording the same, and an apparatus for reproducing the same, which can perform the reproduction with achieving the special reproduction or the like in rapid response to the user's instruction, and further positively offer the possible special functions to the user to invite the user to select the functions.

According to one aspect of the present invention, there is provided an information recording medium including: a plurality of recorded information pieces being independent of each other; a plurality of individual attribute information pieces each corresponding to each of the recorded information piece and including information relating to attributes of the recorded information piece and functions in reproduction of the recorded information piece; and an aggregate attribute information piece, recorded at a position read out prior to any of the recorded information pieces on the recording medium, and including at least a part of the individual attribute information piece for all of the recorded information pieces.

In accordance with the recording medium thus configured, the individual attribute information piece including information relating to attributes of the recorded information piece and functions in reproduction of the recorded information piece is prepared for each recorded information piece. Further, the aggregate attribute information piece including at least a part of the individual attribute information piece for all of the recorded information pieces is recorded at the position read out prior to any of the recorded information pieces on the recording medium. Therefore, by utilizing the aggregate attribute information piece, the attribute information for all recorded information pieces can be rapidly and readily obtained.

The information recording medium may be so configured that the individual attribute information piece and the aggregate attribute information piece include information relating to the kind of the recorded information piece. By this, the attribute information relating to the kind of the recorded information piece may be rapidly and readily obtained.

According to another aspect of the present invention, there is provided an information reproducing apparatus for reproducing an information recording medium including: a plurality of recorded information pieces being independent of each other; a plurality of individual attribute information pieces each corresponding to each of the recorded information piece and including information relating to attributes of the recorded information piece and functions in reproduction; and an aggregate attribute information piece, recorded at a position read out prior to any of the recorded information pieces on the recording medium, and including at least a part of the individual attribute information piece for all of the recorded information pieces, the apparatus including: an input unit for inputting at least one of a designation of the recorded information piece to be reproduced and a designation of information relating at least one of the attribute of and the function in reproduction of the recorded information; and a reproducing unit for reproducing the designated recorded information piece in accordance with the designated information relating to one of the attribute and the function.

In accordance with the reproducing apparatus thus configured, the input unit receives the designation of the recorded information piece and/or the information relating to the attribute and the function of the recorded information piece. The reproducing unit reproduces the recorded information piece designated in accordance with the designated information. Therefore, the recorded information can be reproduced according to the function or the like which is designated by a user.

The reproducing apparatus may further include: a searching unit for searching for all of the recorded information pieces having the attribute designated by the input unit by referring to the aggregate attribute information piece; and a display unit for displaying a result of search by the searching unit.

In accordance with the apparatus thus configured, when the user makes the designation, the searching unit searches for the recorded information pieces having the designated attribute, and the display unit displays the result. Then the user designates the recorded information piece to be reproduced after watching the display, the reproducing unit reproduces the recorded information. Since the searching unit makes the search using the aggregate attribute information piece, it does not have to refer to all individual attribute information, and hence it is possible to quickly notify the recorded information pieces which have the designated attribute. In addition, the user can select a desired recorded information piece by watching the search result displayed.

The reproducing apparatus may further include: a searching unit for searching for all of the recorded information pieces for which the function designated by the input unit can be performed, by referring to the aggregate attribute information piece; and a display unit for displaying a result of search by the searching unit.

In accordance with the apparatus thus configured, when the user makes the designation, the searching unit searches for the recorded information pieces for which the designated function can be performed, and the display unit displays the result. Then the user designates the recorded information piece to be reproduced after watching the display, the reproducing unit reproduces the recorded information. Since the searching unit makes the search using the aggregate attribute information piece, it does not have to refer to all individual attribute information, and hence it is possible to quickly notify the recorded information pieces for which the designated function can be achieved. In addition, the user can select a desired recorded information piece by watching the search result displayed.

The reproducing apparatus may be so configured that the displaying unit displays that the designated function can not be performed, if the searching unit does not find any recorded information piece for which the designated function can be performed. By this, the user can immediately know whether or not the designated function can be achieved.

The reproducing apparatus may further include a display unit for displaying the functions which can be performed for the recorded information piece designated by the input unit. Therefore, the user can rapidly know the functions which can be achieved for the designated recorded information piece.

The reproducing apparatus may further include: a checking unit for checking whether or not the designated function can be performed for the designated recorded information piece, by referring to the aggregate attribute information piece; and a display unit for displaying that the designated function can not be performed, if the checking unit determines that the designated function can not be performed for the designated recorded information piece. By this, the user can immediately know whether or not the designated function can be performed.

The reproducing apparatus may further includes: a checking unit for checking whether or not the designated function can be performed for the designated recorded information piece, by referring to the aggregate attribute information piece; and a control unit for allowing the reproducing unit to reproduce the designated recorded information piece if the checking unit determines that the designated function can be performed for the designated recorded information piece. By this, the reproduction is quickly starts after the designation by the user.

According to still another aspect of the present invention, there is provided an information recording apparatus including: a first producing unit for producing a plurality of recorded information pieces each being independent of each other; a second producing unit for producing a plurality of individual attribute information pieces each corresponding to each of the recorded information piece and including information relating to attributes of the recorded information piece and functions in reproduction of the recorded information pieces; a third producing unit for producing an aggregate attribute information piece including at least a part of the individual attribute information piece for all of the recorded information pieces, and an arranging unit for arranging the recorded information pieces, the individual attribute information pieces and the aggregate attribute information pieces on an information recording medium, wherein the arranging unit positions the aggregate attribute information piece at a position read out prior to any of the recorded information pieces on the recording medium.

In accordance with the recording apparatus thus configured, the third producing unit produces the aggregate attribute information piece and the arranging unit records it at the position read out first. Therefore, it is possible to produce an information recording medium from which the attribute information for all recorded information pieces can be rapidly and readily obtained.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6 is a diagram illustrating an example of VTS attribute information;

FIG. 8 is a diagram illustrating still another example of VTS attribute information;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.
Recorded information piece: VTS (Video Title Set)
Individual attribute information piece: VTS attribute information
Aggregate attribute information piece: VTS attribute information table

[I] Embodiment of Information Record Medium

First of all, a physical structure and a logical structure as well as an operation of a DVD, as one embodiment of the information recording medium to which the present invention is applied, will be explained with reference to FIGS. 1 to 4.

Figure 1:
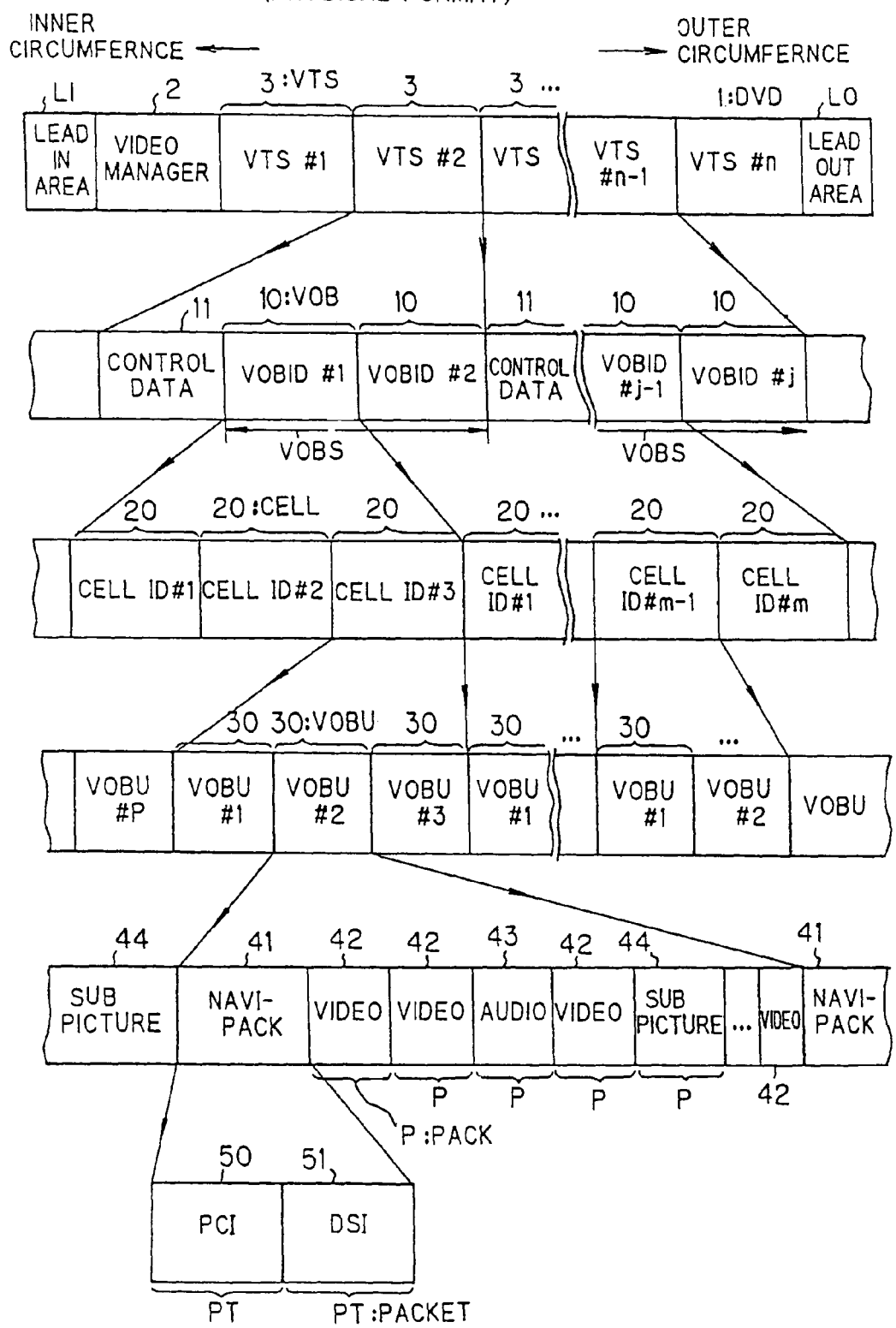
FIG. 1 is a diagram showing a physical structure of record information of a DVD as one embodiment of the present invention.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for accessing each title, information for preventing an illegal copy, an access table for directly accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41 for the control information; a video pack 42 for the video information; an audio pack 43 for the audio information; and a sub picture pack 44 for the sub picture information. Here, in the video pack 42, a packet including the video data and a pack header are recorded. In the audio pack 43, a packet including the audio data and a pack header are recorded. Further, in the sub picture pack 44, a packet including graphics such as a character and a diagram as the sub picture and a pack header are recorded. In the video packs 42, which data amount is relatively large as shown in FIG. 1, one or a plurality of GOPs are recorded within one VOB unit 30. It is prescribed by a standard specification of the DVD that there are 8 kinds of audio recordable on the DVD 1 while 32 kinds of sub picture recordable on the DVD 1.

Further, the video packs 42, the audio packs 43 and the sub picture packs 44 are recorded such that the reproduction time for one VOBU 30 (i.e., the reproduction time corresponding to data recorded between a navi-pack 41 and the next navi-pack 41 neighboring thereto) is equal to or longer than 0.4 second.

Further, there always exists the navi-pack 41 in one VOBU 30. On the other hand, there may not exist each of the video pack 42, the audio pack 43 and the sub picture pack 44 in one VOBU 30, or, even in case that these packs exist in one VOBU 30, the number of the packs and the order of the packs are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, all video data included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Figure 2:
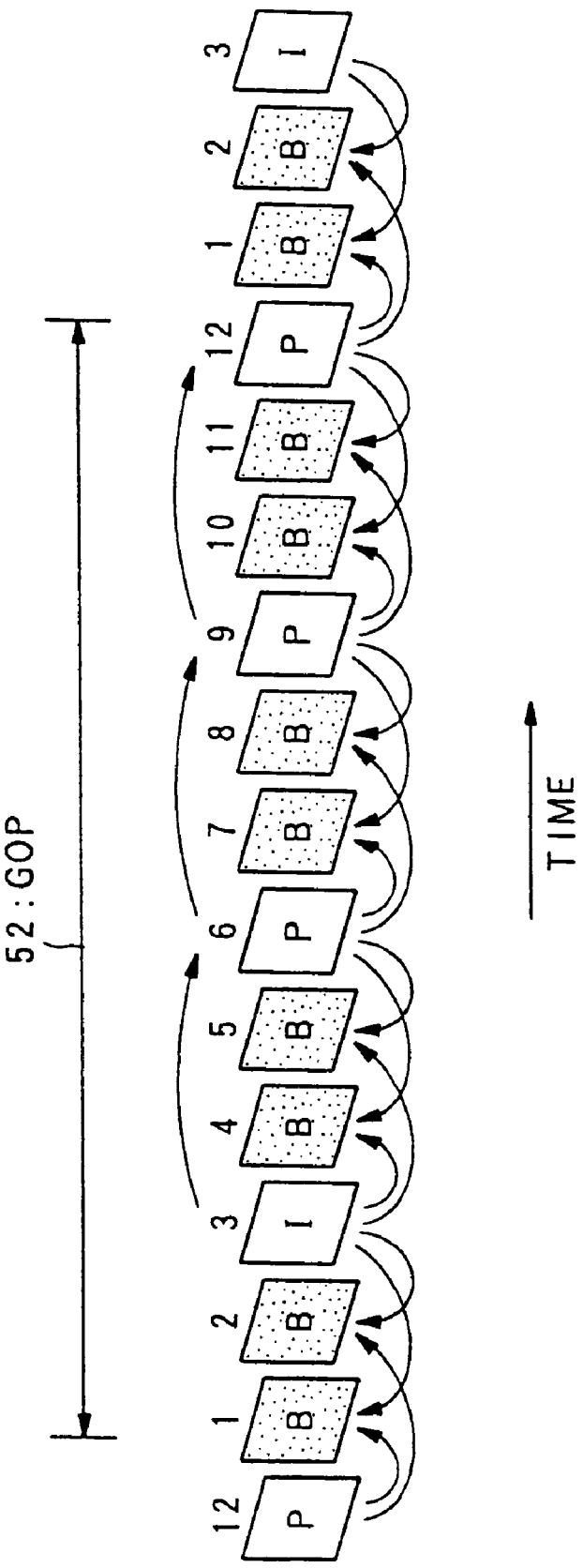
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIG. 1 by combining them (especially combining the cells 20) in the logical structure shown in FIG. 3, is recorded on the DVD 1, especially in the control data 11.

Figure 3:
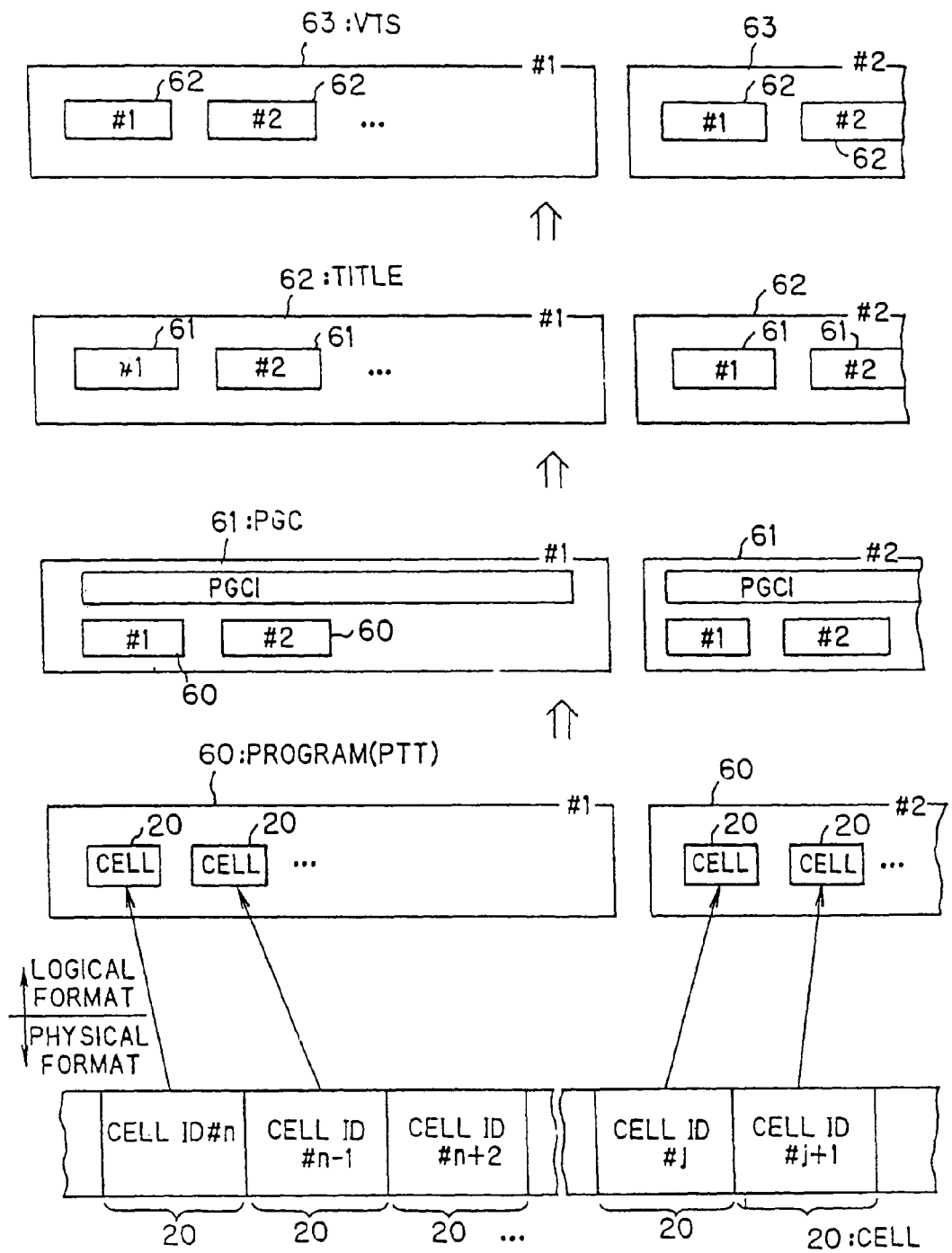
FIG. 3 is a diagram showing a logical structure of the record information of the DVD in FIG. 1.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT Of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Figure 4:
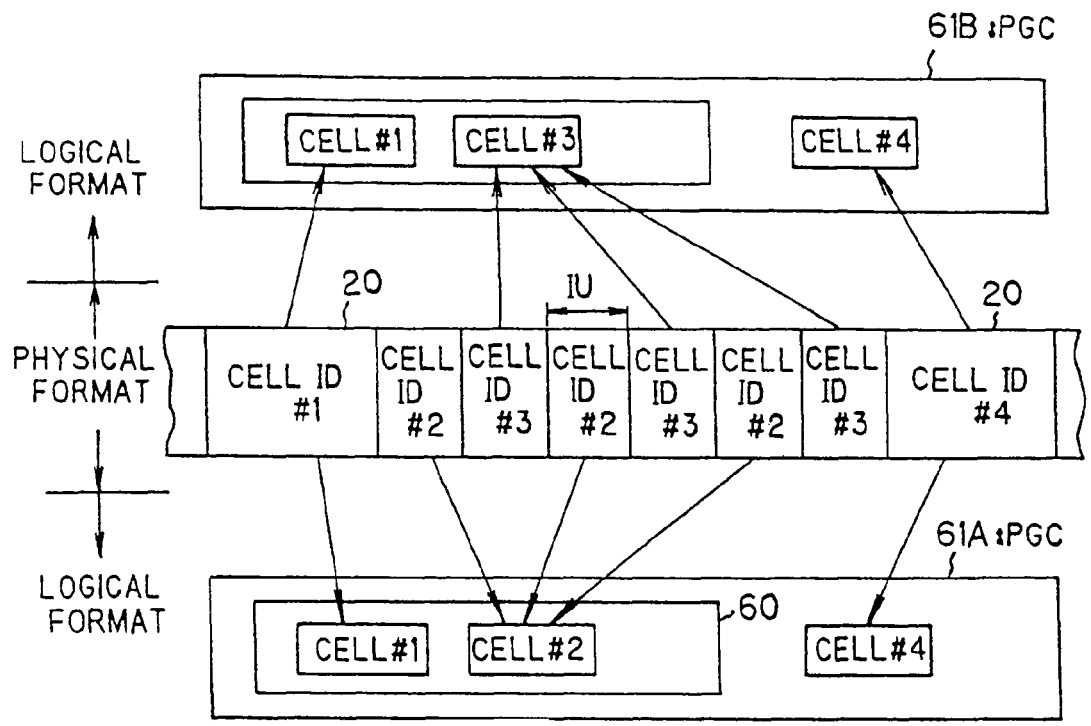
FIG. 4 is a diagram showing a structure of an interleaved unit of the DVD in FIG. 1.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into aplurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Since it is necessary to record information of various hierarchical layers, information according to the above-mentioned recording format is quite suitable for the DVD in which, in recording a movie, not only the information of the movie itself but also the sounds and/or subtitles, for various languages, of the movie are recorded on a single disk.

Next, out of the video information and the audio information having the above-described physical and logical structures, a detailed description will be given of VTS attribute information and VTS attribute information table according to the present invention.

Figure 5:
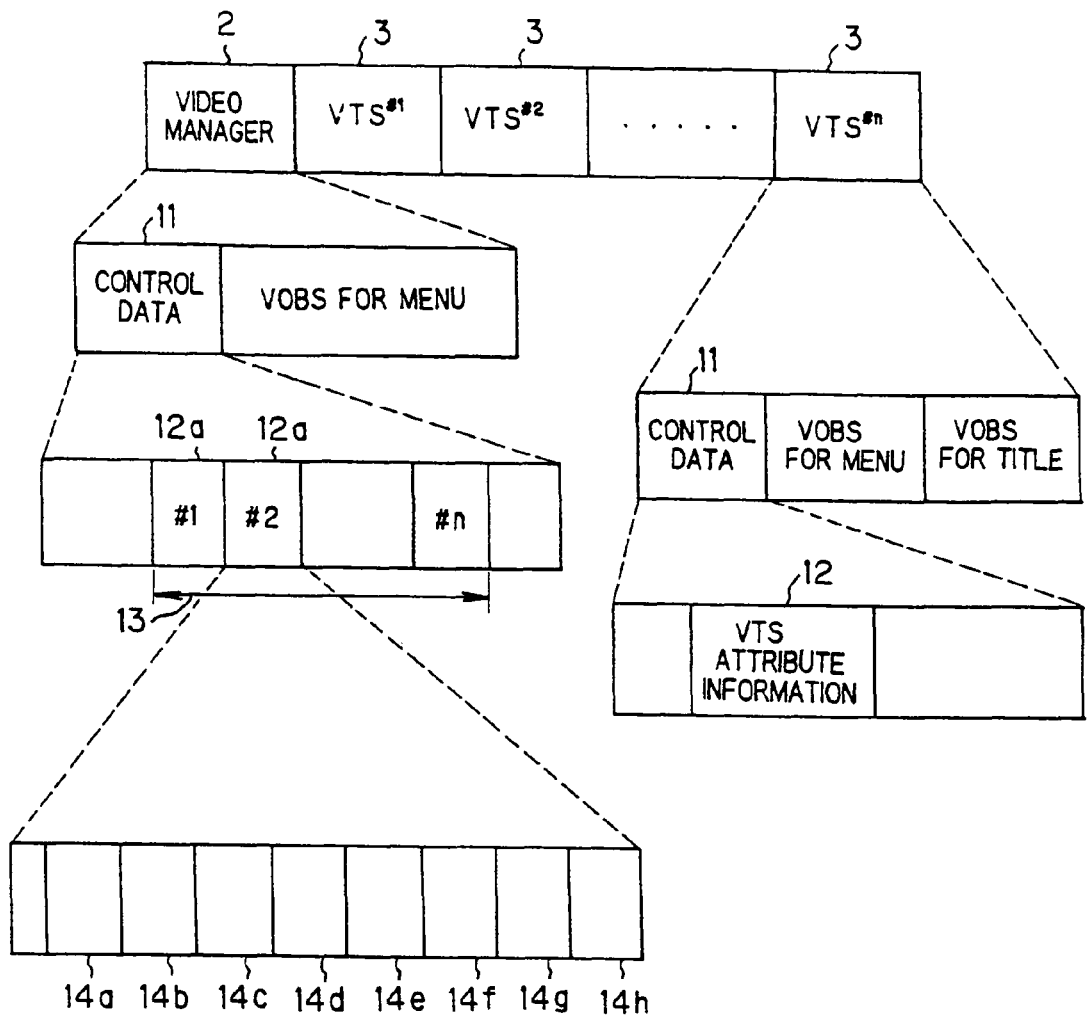
FIG. 5 is a diagram illustrating the recording manner of VTS attribute information according to the present invention.

FIG. 5 shows recording positions of the VTS attribute information on the DVD 1. As shown, the VTS attribute information 12 is included in the control data 11 in each VTS 3. Namely, for all VTS 3, the VTS attribute information 12 is recorded within the control data 11. The VTS attribute information is information which prescribes attributes and/or specifications of the video information and the audio information in the VTS 3 as well as functions or the like to be performed at the time of reproduction thereof (described later in detail). Therefore, the VTS attribute information #n is attribute information with respect to the video information or the like included in the VTS #n.

Further, in the present invention, a part or all of the VTS attribute information 12 included, respectively, in the VTS 3 are also included in the control data 11 in the video manager 2. This is referred to as VTS attribute information 12a (see. FIG. 5). Namely, the VTS attribute information 12a for all VTS 3 which are under the management by the video manager 2 are included aggregately in the control data 11 within the video manager 2. The aggregation of the VTS attribute information 12a is referred to as VTS attribute information table 13.

Next, specific contents of the VTS attribute information 12a will be described. As shown in FIG. 5, one VTS attribute information 12a includes a plurality of attribute information 14a to 14h, which collectively specify a manner of processing of the recorded information and/or a data format of the recorded information. It is noted that the VTS attribute information 12a may be all or a part of the attribute information in the VTS attribute information 12 in each VTS 3 as described above. However, in the following description, it is assumed that the VTS attribute information 12a in the video manager 2 includes only a part of the attribute information of the VTS attribute information 12 in the VTS 3.

The attribute information 14a indicates a category of the VTS, and specifically includes a copy flag 15a, reproduction apparatus limitation information 15b and application type 15c. The copy flag 15a indicates whether or not the digital copying of the information in the title to other recording medium is permitted. The reproduction apparatus limitation information 15b indicates whether the information in this title is permitted to be reproduced by only certain reproduction apparatuses or is permitted to be reproduced by all kinds of reproduction apparatuses. More concretely, this information is used to prohibit that the titles recorded only for business-use is reproduced by a private-use type reproduction apparatus. The application type 15c is information relating to the kinds of the video and audio information recorded in the title.

Figure 7:
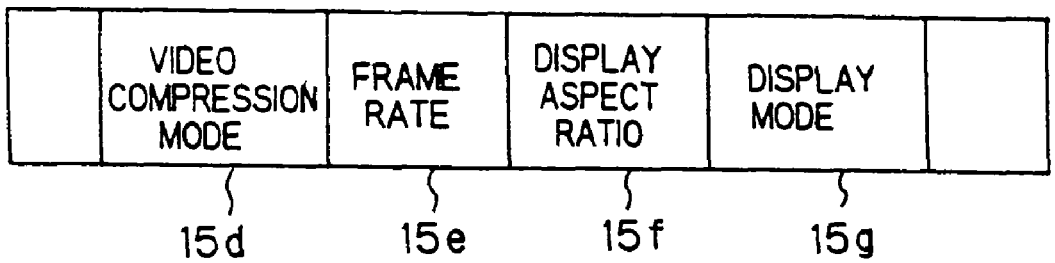
FIG. 7 is a diagram illustrating another example of VTS attribute information.

The attribute information 14b indicates video attribute, and specifically includes video compression mode 15d, frame rate 15e, aspect ratio 15f and display mode 15g as shown in FIG. 7. The video compression mode indicates the picture compression method used in compressing the video information, and includes MPEG1 and MPEG2. The frame rate 15e is the frame rate of the video information recorded, and includes 29.97/s in the NTSC system and 25/s in the PAL system. The aspect ratio 15f indicates the aspect ratio of the video information recorded, and includes the ratio 9:16 for the wide TV as well as the normal ratio 3:4. The display mode 15g indicates the method of displaying the video information according to the wide aspect ratio 9:16 as-pictures of normal aspect ratio 3:4, and includes the pan-scan display method which cuts out the right and left side portions of the wide video information and the letterbox display method which displays the black band areas at the top and the bottom of the screen.

The attribute information 14c is a number of audio streams, and specifically indicates the number of the audio streams included in the title. Here, audio stream is an aggregation (or a gathering) of the audio information units. The attribute information 14d indicates the attributes of the respective audio streams, and includes a coding system of audio information 15h, multi-channel information 15i, audio type 15j, application type 15k, quantization bit number 15l, sampling frequency 15m and channel number 15n. The coding system 15h prescribes the coding system such as Dolby AC3, linear PCM and the like, and the multi-channel information 15i indicates the presence of the multi-channel audio stream attribute information 14h corresponding to the audio stream. The audio type 15j indicates whether or not the audio information includes languages (lyrics, etc.). The application type 15k indicates the purpose of the audio information if it is multi-channel information, and includes a karaoke-use, a audio-surround or the like. The quantization bit number 15l and the sampling frequency 15m indicate the quantization bit number and the sampling frequency of the audio information. The channel number 15n represents the channel number of the audio information.

The attribute information 14d includes application information 15p which contents is different dependently upon the application type 15k. For example, when the application type 15k indicates the karaoke-use, the application information 15p indicates the distribution manner of the audio signals to multiple channels, the playing version, presence or absence of introduction part, which one of the solo play or duo play, etc. The attribute information 14d including the above described information are included for the number of audio streams.

The attribute information 14e indicates a number of sub pictures, and the attribute information 14f indicates an attribute of a sub picture stream. The attribute information 14f includes the coding system of the sub pictures, the display modes such as the letterbox display method, the pan-scan display method or the like, and the kinds of the sub pictures (language or non-language), etc. The attribute information 14g indicates the number of the multi-channel audio streams which multi-channel attribute information 15i indicates the presence of the multi-channel attribute information. The attribute information 14h indicates attributes of the respective multi-channel audio streams. The attribute information 14h includes information relating to the mixing between the channels and information relating to the contents of each channel, which includes the presence or absence of guide melody or guide melodies of solo play or duo play in the case of karaoke, for example.

As described above, in the present invention, the attribute information for all titles are recorded aggregately (collectedly) at the position which is accessed prior to any other portions in the DVD, i.e., in the video manager 2. Therefore, the attribute information for all titles can be rapidly obtained without individually accessing to the control data of every VTS one after another.

[II] Embodiment of Recording Apparatus

Next, an embodiment of recording apparatus for recording the above mentioned control information video information and audio information onto the DVD 1 will be explained with reference to FIG. 9.

At first, a construction and an operation of the recording apparatus as the embodiment is explained with reference to FIG. 9.

Figure 9:
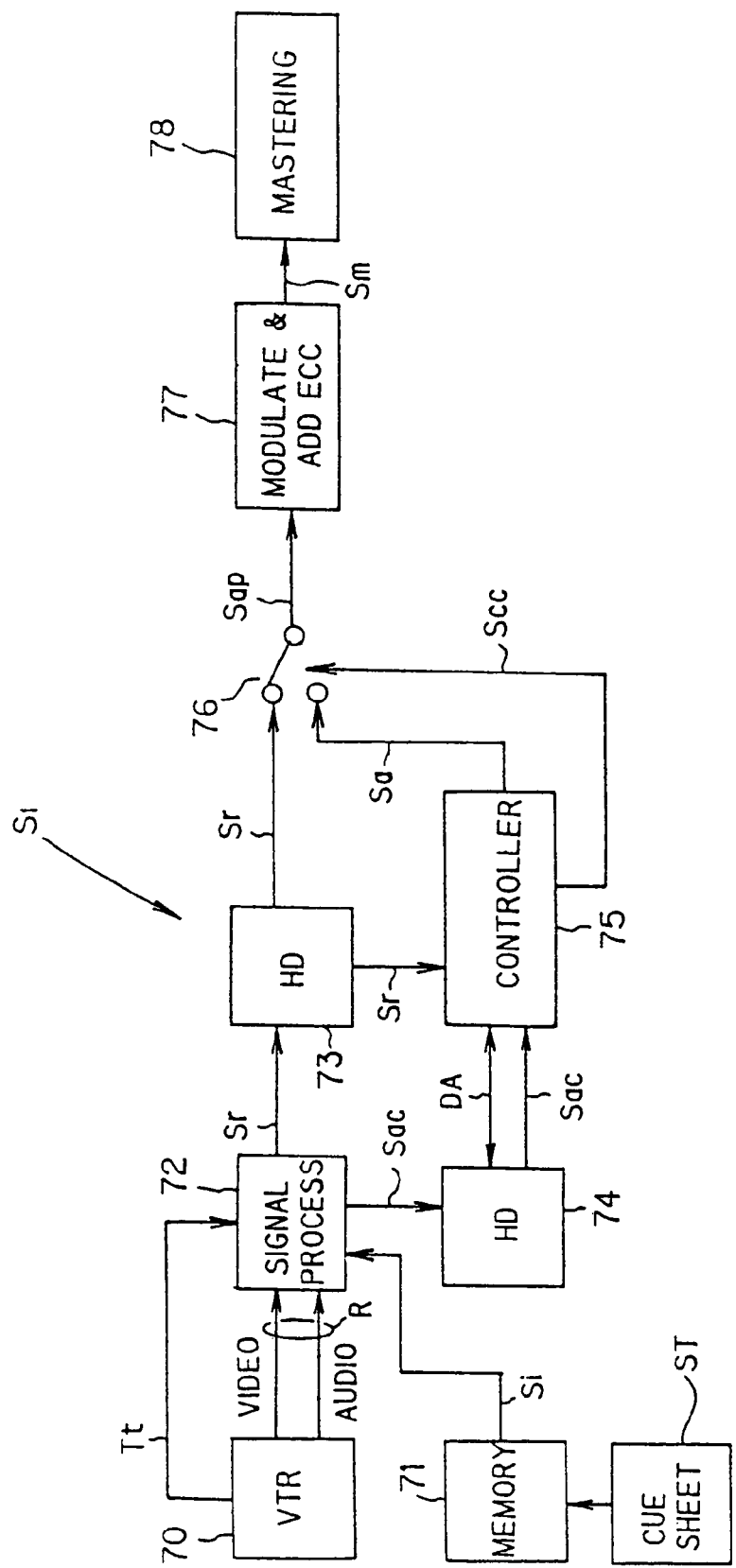
FIG. 9 is a block diagram of an information recording apparatus for recording the DVD in FIG. 1, according to the present invention.

As shown in FIG. 9, a recording apparatus S1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores content information related to the partial record information Pr which is inputted beforehand on the basis of a cue sheet ST, on which the VTS attribute information are written. Then, the memory 71 outputs it as a content information signal Si on the basis of a request from the signal process unit 72.

Then, the signal process unit 72 generates and outputs an access information signal Sac corresponding to the partial record information Pr with referring to a time code Tt, on the basis of the time code Tt corresponding to the record information R outputted from the VTR 70 and the content information signal Si outputted from the memory 71. Then, the access information signal Sac is temporarily stored in the hard disk device 74. The above described processes are performed with respect to the whole record information R.

When the above described processes are finished as for the whole record information R, the controller 75 reads out the compressed multiplexed signal Sr from the hard disk device 73, reads out the access information signal Sac from the hard disk device 74, generates additional information DA on the basis of these read out signals, and stores the additional information DA into the hard disk device 74. The concrete contents of the VTS attribute information 12 according to the present invention has determined in advance, for every VTS, by the producer of the DVD 1, and is recorded in the hard disk 74. By the control of the signal processing unit 72, the VTS attribute information 12 is included in the additional information DA. In addition, a part or all portions of the VTS attribute information 12 of each VTS 3 are aggregated to constitute the VTS attribute information table 13. The VTS attribute information table 13, which is the aggregation of the VTS attribute information 12a, is included in the additional information DA as the information to be recorded in the control data 11 in the video manager 2.

On the other hand, the controller 75 performs a time management for each of the operations of the signal process unit 72, the hard disk device 73 and the hard disk device 74, and reads out the additional information DA from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed signal Sap. In the stage of the information added compressed multiplexed signal Sap, the information to be recorded has the physical structure (physical format) shown in FIG. 1 as the result of the multiplexing of the video information and the audio information by the switching operation according to the information selection signal Scc from the controller 75. If there exists the sub picture information to be recorded, it is inputted, by other means such as a hard disk device not illustrated, to the signal process unit 72, so that it is processed in the same manner as the video and audio information thereat.

Then, the modulator 77 adds an error correction code (ECC), such as a Reed Solomon code, and applies a modulation such as an eight to sixteen (8-16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

By the above-described operation, there is produced a DVD disk which includes the VTS attribute information 12 in the control data 11 of each VTS 3 and the VTS attribute information table 13, which is the aggregation of the VTS attribute information 12a, is included in the control data 11 of the video manager 2.

[III] Embodiment of Reproducing Apparatus

Next, an embodiment of reproducing apparatus for reproducing the information recorded on the DVD 1 by the above mentioned recording apparatus will be explained with reference to FIGS. 10 to 12.

At first, a construction and an operation of the reproducing apparatus as the embodiment is explained with reference to FIG. 10.

Figure 10:
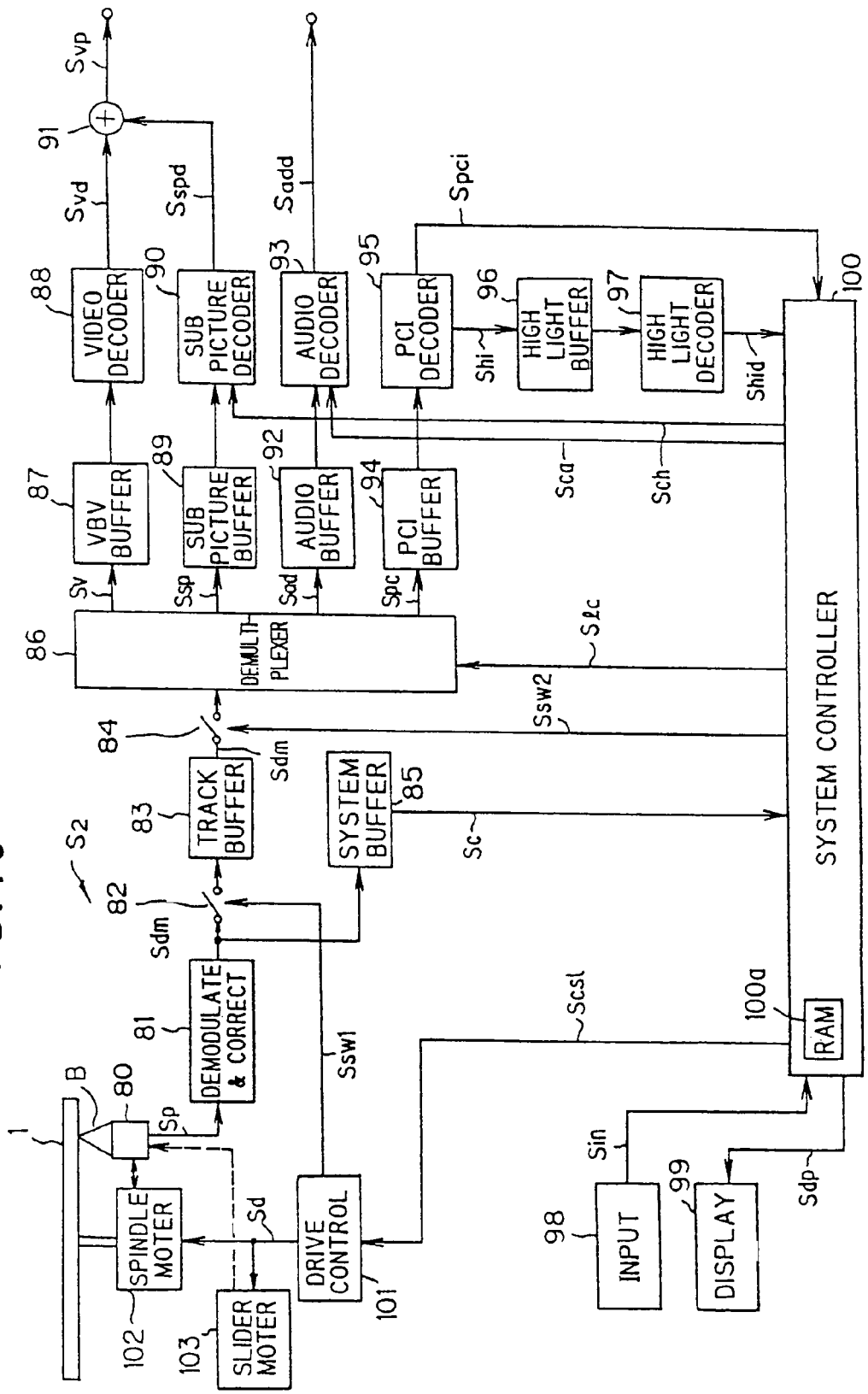
FIG. 10 is a block diagram of an information reproducing apparatus for reproducing the DVD in FIG. 1, according to the present invention.
Figure 11:
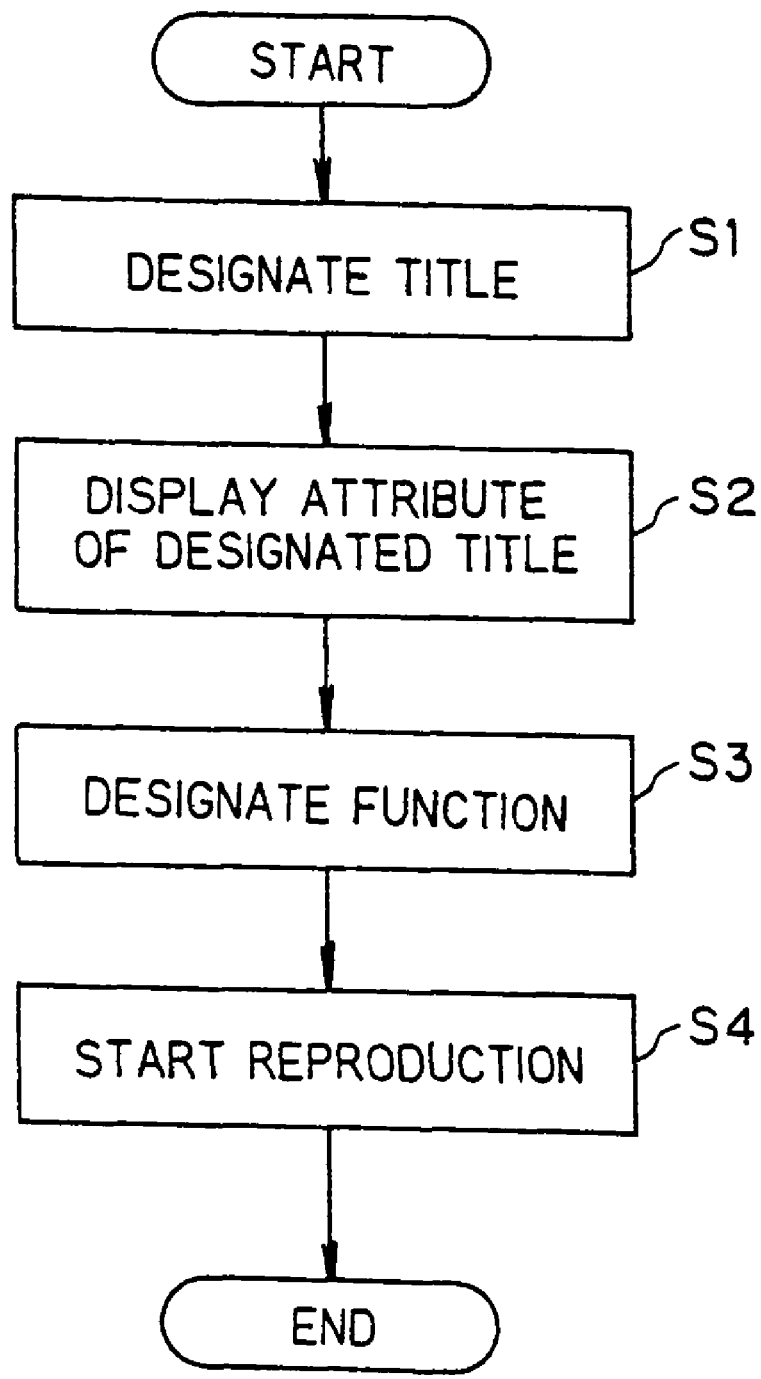
FIG. 11 is a flowchart showing a reproducing operation responding to a designation of title by a user.

As shown in FIG. 10, a reproducing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 10 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MEPG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the video manager 2, the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI packet 51 for each navi-pack 41 (refer to FIG. 1) as the occasion demands while reproducing the information, to output it also as the control information Sc.

Therefore, the VTS attribute information 12 included in the VTS 3 and the VTS attribute information table 13 included in the video manager are accumulated in the system buffer 85, and then are outputted to the system controller 100 as the control information Sc. The system controller stores these information in the RAM 100*a*. The control information recorded in the video manager 2, which includes the manner of processing of the recorded information and/or a data format of the recorded information is read out and acquired first at the time when the DVD 1 is set in the reproducing apparatus. Therefore, the VTS attribute information table 13 in the video manager 2 is acquired immediately after the setting of the DVD 1 and stored in the RAM 100*a* of the system controller 100.

The demultiplexer 86, to which the demodulation signal Sdm is continuously inputted through the stream switch 84, separates the video information, the audio information, the sub picture information and the PCI packet 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio information or the sub picture information in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated. If it is detected by the system controller 100 that it is necessary to temporarily stop (pause) the audio voice in the reproduction immediately after accessing, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI packet 50, which is included in the PCI signal Spc, with the video information, the audio information and the sub picture information corresponding to the PCI packet 50, and apply the PCI packet 50 to the video information and the like. Then, from the PCI signal Spc, which is synchronized with the corresponding the video information and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, the language selection signal Slc, the pause signal Sca and the high light control signal Sch to correctly perform the reproduction corresponding to those input signals, and also outputs a display signal Sdp to display an operation condition etc. of the reproducing apparatus S2 to the display unit 99 such as the liquid crystal device.

Further, the system controller 100 outputs a seamless control signal Scs1 corresponding to the track jump process, to the drive controller 101, when it detects by the control signal Sc etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 9), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Next, in the operation of the above described reproducing apparatus S2, the reproducing operation relating to the VTS attribute information will be described. The reproducing apparatus S2 according to the present invention can perform the reproduction in two different manners. The first manner is a normal reproduction manner in which the user selects a desired title and instructs the reproduction of the same. The second manner is that the user designates a certain function or specification or the like, and the reproducing apparatus S2 displays titles which can be reproduced according to the function or the like designated by the user, and then the user designates one of the titles displayed to start reproduction of it. These two reproduction manners will be described below.

(1) In the case that the user designates the title:

First, the description will be given of the reproduction manner in which the user designates the title to reproduce it. The operation in this reproduction manner is shown in the flowchart of FIG. 11.

First, the user designates a desired one of the titles recorded on the DVD 1 to be reproduced, using the input unit 98, and instructs the start of the reproduction (step S1) The system controller 100 refers to the VTS attribute information table 13 which is supplied from the system buffer 85 and stored in the RAM 100*a*. Specifically, the system controller 100 detects the VTS attribute information 12*a* which corresponds to the title designated by the user, and displays a part or all of the VTS attribute information 12*a* on the display 99 (step S2). The user sees the attribute information related to the title, and know the attribute of the title which he has designated. For example, if the user designates a movie, he can know as to whether the video information of the movie is coded according to MPEG1 system or MPEG2 system. If the user designates a song, he can know information as to whether the song is karaoke version or normal version (i.e., lyrics are included), whether the song is recorded in stereo mode or monaural mode, and/or what are the sampling frequency and the quantization bit number. Further, in this display, the user is invited to designate functions or the like which is user-selectible. For example, as for the display mode of video information (attribute information 14*b*, 15*g*), if the title can be reproduced in one of the letterbox display method and the pan-scan display method, the system controller 100 invites the user to select one of those display methods. When the user makes the designation (step S3) the system controller 100 searches for the VTS 3 of the title and starts reproduction of the title according to the functions or the like thus designated (step S4).

In the above example, if the user designates the pan-scan display method in step S3, the title, such as movie, which is selected by the user in step S1 is displayed on the monitor or the like (not shown) in the pan-scan display mode. In the case of karaoke, since the presence or absence of the guide melody and/or guide vocal is recognized by the attribute information 14*b* of the video attribute and the attribute information 14*h* of the multi-channel audio streams, the reproduction is started after designating such items. The invitation of the user's designation may not be necessarily made using the CRT display, but may be made using a liquid crystal display or LED. Further, if the function which can not be achieved is designated, the system controller 100 may display that the designated function can not be performed for the selected title.

In the above manner, it is possible to reproduce the title selected by the user in the reproduction manner designated by the user. Further, in the present invention, since the VTS attribute information 12*a* is recorded aggregately in the video manager 2, it is unnecessary to search for the recording position of the VTS 3 corresponding to the title selected by the user in response to the selection thereof and to read out the VTS attribute information 12 included in the searched VTS 3. Therefore, it is possible to rapidly show the attribute information of the selected title to the user and start reproduction of the title.

(2) In the case that the user designates the function or the specification:

Next, the description will be given of the reproduction manner in which the user designates the function or the specification and the title satisfying the designated function or the like is reproduced. In the normal manner of reproduction, the user selects a desired title and instructs reproduction thereof. However, in some cases, the user might wish to reproduce information on the DVD which has a particular specification, or by a particular function. For example, the user may wish to reproduce karaoke songs among many songs recorded on a certain DVD, or high sound quality music which are recorded by a large quantization bit number and/or high sampling frequency. The reproduction operation in such a case will be explained below with reference to FIG. 12.

Figure 12:
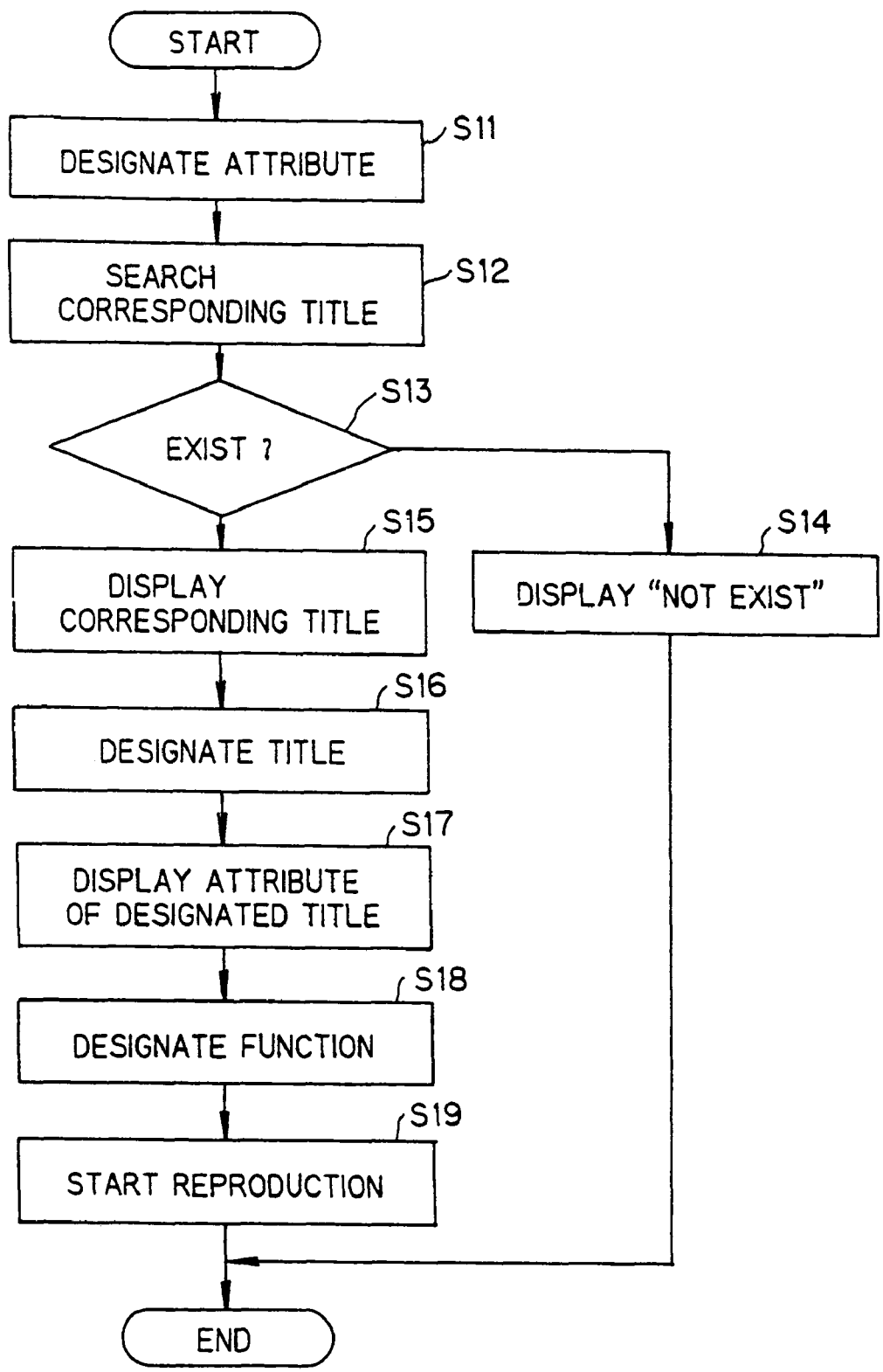
FIG. 12 is a flowchart showing a reproducing operation responding to a designation of function and/or specification by a user.

In FIG. 12, first the user designates a certain attribute which he desires (S11), for example, "karaoke songs". The system controller 100 accesses to the RAM 100*a* to refer to the VTS attribute information table 13, and searches for the titles including the karaoke songs from the plural titles (step S12). Specifically, the system controller 100 refers to the respective VTS attribute information 12*a* in the VTS attribute information table 13, and seeks for the attribute information 12*a* having the application type 15*c* of "0001" (see. FIG. 6). If there is no such title (step S13:No), the system controller 100 shows that "there is no titles designated" on the display 99 or the like and ends the operation (step 14).

On the other hand, if there exist titles satisfying the designated function or the like (S13: Yes), the system controller 100 displays the list of those titles on the display 99, and invites the user to select the title from them (step S15). When the user designates the title (step S16), the system controller 100 refers to the VTS attribute information 12*a* corresponding to the designated title and displays it (step S17). Further, the system controller 100 invites the user to designate other functions if there are some other functions which can be achieved for the title. Then, after the designation by the user (step S18), the system controller 100 searches for the VTS 3 which includes the title and start the reproduction of it (step S19).

Further, it is possible, for karaoke songs, to search for songs (title) having a particular functions, such as duo song or song with no guide melody by referring to the attribute information 13*d* and the attribute information 14*h* of the multichannel audio stream. In this case, the system controller 100 searches for the title which application type 15*c* is "0001" and having the function designated by the user, and, when the user designates the title among the displayed titles, the system controller 100 searches for the VTS 3 of the title to start the reproduction of it.

As described above, according to the present invention, the video manager 2 includes the VTS attribute information table which is acquired at the time of setting the DVD in the reproducing apparatus to be stored in the memory in the system controller. Therefore, when the user designates the attribute, specification and/or function, the system controller can rapidly search for and display the titles which have the designated function or the like. Namely, it is unnecessary to search all VTS attribute information 12 recorded in the respective VTSs 3 for finding out the titles meeting the user's designation, thereby enabling quick response to the user's instruction. In addition, it is possible to make reproduction in view of various attributes, specifications and functions by prescribing various attribute information, thereby achieving various enjoyable reproductions of the same DVD to satisfying the user's taste.

What is claimed is:

1. An information recording apparatus comprising:
   a first producing device which produces at least one recorded information piece;
   a second producing device which produces at least one individual attribute information piece, each individual attribute information piece corresponding to a recorded information piece and including attribute information of the corresponding recorded information piece;
   a third producing device which produces an aggregate attribute information piece including at least a part of information included in all of the at least one individual attribute information piece;
   a recording device which records the recorded information piece, the individual attribute information piece, and the aggregate attribute information piece on an information recording medium; and
   wherein the recorded information piece includes at least one title, and said attribute information includes at least information items of video compression mode, multi-channel information, audio type, and number of channels, which are commonly included in said individual attribute information piece and said aggregate information piece.

2. The apparatus according to claim 1, wherein attributes of the title included in each of the at least one recorded information piece are the same as each other.

3. The apparatus according to claim 1, wherein the recorded information piece includes video information, and
   wherein the individual attribute information piece and the aggregate attribute information piece include information indicating at least one of a video compression mode, an aspect ratio, and a display mode of the video information.

4. The apparatus according to claim 1, wherein the recorded information piece includes audio information, and
   wherein the individual attribute information piece and the aggregate attribute information piece include information indicating at least one of a coding system, quantization bit number, sampling frequency, and channel number of the audio information.

5. The apparatus according to claim 1, wherein the recorded information piece includes sub picture information, and
   wherein the individual attribute information piece and the aggregate attribute information piece include information indicating at least one of a coding system and kinds of the sub picture information.

6. The apparatus according to claim 1, wherein the individual attribute information piece and the aggregate attribute information piece include application type information indicating kind of recorded information included in the recorded information piece.

7. The apparatus according to claim 1, wherein each recorded information piece has an ID number, and
wherein information included in the individual attribute information piece is disposed in accordance with an order of the ID number in the aggregate attribute information piece.

8. The apparatus according to claim 1, wherein the recording medium is a master disk, and
the apparatus further comprises a producing device which produces a replica disk by using the master disk.

9. An information reproducing apparatus for reproducing information from an information recording medium comprising:
at least one recorded information piece;
at least one individual attribute information piece, each individual attribute information piece corresponding to a recorded information piece and including attribute information of the corresponding recorded information piece, and
an aggregate attribute information piece including at least a part of information included in all of the at least one individual attribute information piece,
wherein the recorded information piece includes at least one title, and said attribute information includes at least information items of video compression mode, multichannel information, audio type, and number of channels, which are commonly included in said individual attribute information piece and said aggregate information piece,
the apparatus comprising:
an input device through which a designation of a title to be reproduced is inputted; and
a reproducing device which reproduces the designated title.

10. The apparatus according to claim 9, further comprising:
a storing device which stores the aggregate attribute information piece reproduced from the recording medium; and
a generating device which generates a display signal corresponding to at least a part of attribute information corresponding to the designated title by referring to the stored aggregate attribute information piece.

11. The apparatus according to claim 10, wherein the input device enables to designate the attribute information displayed based on the display signal, and
wherein the reproducing device reproduces the designated title in accordance with the designated attribute information.

12. An information reproducing apparatus for reproducing information from an information recording medium comprising:
at least one recorded information piece;
at least one individual attribute information piece, each individual attribute information piece corresponding to a recorded information piece and including attribute information of the corresponding recorded information piece, and
an aggregate attribute information piece including at least a part of information included in all of the at least one individual attribute information piece,
wherein the recorded information piece includes at least one title, and said attribute information includes at least information items of video compression mode, multichannel information, audio type, and number of channels, which are commonly included in said individual attribute information piece and said aggregate information piece.,
the apparatus comprising:
a storing device which stores the aggregate attribute information piece reproduced from the information recording medium;
an input device through which a designation regarding a predetermined attribute is inputted; and
a generating device which generates a display signal corresponding to a title having the designated attribute by referring to the stored aggregate attribute information piece.

13. The apparatus according to claim 12, wherein the input device inputs a designation of the title displayed based on the display signal,
the apparatus further comprising a reproducing device which reproduces the designated title.

14. An information reproducing apparatus for reproducing information from an information recording medium comprising:
at least one recorded information piece;
at least one individual attribute information piece, each individual attribute information piece corresponding to a recorded information piece and including attribute information of the corresponding recorded information piece, and
an aggregate attribute information piece including at least a part of information included in all of the at least one individual attribute information piece,
wherein the recorded information piece includes at least one title, and said attribute information includes at least information items of video compression mode, multichannel information, audio type, and number of channels, which are commonly included in said individual attribute information piece and said aggregate information piece,
the apparatus comprising:
a storing device which stores the aggregate attribute information piece reproduced from the information recording medium;
an input device through which a designation regarding a predetermined function is inputted; and
a generating device which generates a display signal corresponding to a title for serving the designated function by referring to the stored aggregate attribute information piece.

15. The apparatus according to claim 14, wherein the input device inputs a designation of the title displayed based on the display signal, and
the apparatus further comprises a reproducing device which reproduces the designated title.

16. An information processing apparatus comprising:
a first producing device which produces at least one recorded information piece;
a second producing device which produces at least one individual attribute information piece, each individual attribute information piece corresponding to a recorded information piece and including attribute information of the corresponding recorded information piece;
a third producing device which produces an aggregate attribute information piece including at least a part of information included in all of the at least one individual attribute information piece; and
wherein the recorded information piece includes at least one title, and said attribute information includes at least information items of video compression mode, multichannel information, audio type, and number of channels, which are commonly included in said individual attribute information piece and said aggregate information piece.

17. The apparatus according to claim 16, wherein attributes of the title included in each of the at least one recorded information piece are the same as each other.

18. The apparatus according to claim 16, wherein the recorded information piece includes video information, and
wherein the individual attribute information piece and the aggregate attribute information piece include information indicating at least one of a video compression mode, an aspect ratio, and a display mode of the video information.

19. The apparatus according to claim 16, wherein the recorded information piece includes audio information, and
wherein the individual attribute information piece and the aggregate attribute information piece include information indicating at least one of a coding system, quantization bit number, sampling frequency, and channel number of the audio information.

20. The apparatus according to claim 16, wherein the recorded information piece includes sub picture information, and
wherein the individual attribute information piece and the aggregate attribute information piece include information indicating at least one of a coding system and kinds of the sub picture information.

21. The apparatus according to claim 16, wherein the individual attribute information piece and the aggregate attribute information piece include application type information indicating kind of recorded information included in the recorded information piece.

22. The apparatus according to claim 16, wherein each recorded information piece has an ID number, and
wherein information included in the individual attribute information piece is disposed in accordance with an order of the ID number in the aggregate attribute information piece.

23. A method for recording information on an information recording medium comprising the steps of:
producing at least one recorded information piece;
producing at least one individual attribute information piece, each individual attribute information piece corresponding to a recorded information piece and including attribute information of the corresponding recorded information piece;
producing an aggregate attribute information piece including at least a part of information included in all of the at least one individual attribute information piece;
recording the recorded information piece, the individual attribute information piece, and the aggregate attribute information piece on the information recording medium; and
wherein the recorded information piece includes at least one title, and said attribute information includes at least information items of video compression mode, multi-channel information, audio type, and number of channels, which are commonly included in said individual attribute information piece and said aggregate information piece.

24. The method according to claim 23, wherein attributes of the title included in each of the at least one recorded information piece are the same as each other.

25. The method according to claim 23, wherein the recorded information piece includes video information, and
wherein the individual attribute information piece and the aggregate attribute information piece include information indicating at least one of a video compression mode, an aspect ratio, and a display mode of the video information.

26. The method according to claim 23, wherein the recorded information piece includes audio information, and
wherein the individual attribute information piece and the aggregate attribute information piece include information indicating at least one of a coding system, quantization bit number, sampling frequency, and channel number of the audio information.

27. The method according to claim 23, wherein the recorded information piece includes sub picture information, and
wherein the individual attribute information piece and the aggregate attribute information piece include information indicating at least one of a coding system and kinds of the sub picture information.

28. The method according to claim 23, wherein the individual attribute information piece and the aggregate attribute information piece include application type information indicating kind of recorded information included in the recorded information piece.

29. The method according to claim 23, wherein each recorded information piece has an ID number, and
wherein information included in the individual attribute information piece is disposed in accordance with an order of the ID number in the aggregate attribute information piece.

30. The method according to claim 23, wherein the recording medium is a master disk, and
the method further comprises a step of producing a replica disk by using the master disk.

31. A method for reproducing information from an information recording medium comprising:
at least one recorded information piece;
at least one individual attribute information piece, each individual attribute information piece corresponding to a recorded information piece and including attribute information of the corresponding recorded information piece, and
an aggregate attribute information piece including at least a part of information included in the individual attribute information,
wherein the recorded information piece includes at least one title, and said attribute information includes at least information items of video compression mode, multi-channel information, audio type, and number of channels, which are commonly included in said individual attribute information piece and said aggregate information piece,
the method comprising the steps of:
inputting a designation of a title to be reproduced; and
reproducing the designated title.

32. The method according to claim 31, further comprising steps of:
storing the aggregate attribute information piece reproduced from the recording medium; and
generating a display signal corresponding to at least a part of attribute information corresponding to the designated title by referring to the stored aggregate attribute information piece.

33. The method according to claim 32, further comprising steps of:
designating the attribute information displayed based on the display signal; and reproducing the designated title in accordance with the designated attribute information.

34. A method for reproducing information from an information recording medium comprising:
   at least one recorded information piece;
   at least one individual attribute information piece, each individual attribute information piece corresponding to a recorded information piece and including attribute information of the corresponding recorded information piece, and
   an aggregate attribute information piece including at least a part of information included in the individual attribute information,
   wherein the recorded information piece includes at least one title, and said attribute information includes at least information items of video compression mode, multi-channel information, audio type, and number of channels, which are commonly included in said individual attribute information piece and said aggregate information piece,
   the method comprising steps of:
   storing the aggregate attribute information piece reproduced from the information recording medium;
   inputting a designation regarding a predetermined attribute; and
   generating a display signal corresponding to a title having the designated attribute by referring to the stored aggregate attribute information piece.

35. The method according to claim 34, further comprising steps of:
   designating the title displayed based on the display signal; and
   reproducing the designated title.

36. A method for reproducing information from an information recording medium comprising:
   at least one recorded information piece;
   at least one individual attribute information piece, each individual attribute information piece corresponding to a recorded information piece and including attribute information of the corresponding recorded information piece, and
   an aggregate attribute information piece including at least a part of information included in all of the at least one individual attribute information piece,
   wherein the recorded information piece includes at least one title, and said attribute information includes at least information items of video compression mode, multi-channel information, audio type, and number of channels, which are commonly included in said individual attribute information piece and said aggregate information piece, the method comprising steps of:
   storing the aggregate attribute information piece reproduced from the information recording medium;
   inputting a designation regarding a predetermined function; and
   generating a display signal corresponding to a title for serving the designated function by referring to the stored aggregate attribute information piece.

37. The method according to claim 36, further comprising steps of:
   designating the title displayed based on the display signal; and
   reproducing the designated title.

38. An information recording medium comprising:
   at least one recorded information piece;
   at least one individual attribute information piece, each individual attribute information piece corresponding to a recorded information piece and including attribute information of the corresponding recorded information piece, and
   an aggregate attribute information piece including at least a part of information included in all of the at least one individual attribute information piece, and
   wherein the recorded information piece includes at least one title, and said attribute information includes at least information items of video compression mode, multi-channel information, audio type, and number of channels, which are commonly included in said individual attribute information piece and said aggregate information piece.

39. The medium according to claim 38, wherein attributes of the title included in each of the at least one recorded information piece are the same as each other.

40. The medium according to claim 38, wherein the recorded information piece includes video information, and
   wherein the individual attribute information piece and the aggregate attribute information piece include information indicating at least one of a video compression mode, an aspect ratio, and a display mode of the video information.

41. The medium according to claim 38, wherein the recorded information piece includes audio information, and
   wherein the individual attribute information piece and the aggregate attribute information piece include information indicating at least one of a coding system, quantization bit number, sampling frequency, and channel number.

42. The medium according to claim 38, wherein the recorded information piece includes sub picture information, and
   wherein the individual attribute information piece and the aggregate attribute information piece include information indicating at least one of a coding system information and kinds of the sub picture information.

43. The medium according to claim 38, wherein the individual attribute information piece and the aggregate attribute information piece include application type information indicating kind of recorded information included in the recorded information piece.

44. The medium according to claim 38, wherein information included in the individual attribute information piece is disposed in accordance with an order of an ID number in the aggregate attribute information piece.

* * * * *